(12) United States Patent
Kim

(10) Patent No.: US 10,090,543 B2
(45) Date of Patent: Oct. 2, 2018

(54) FUEL CELL AND CONTROL METHOD FOR THE SAME

(71) Applicant: HYUNDAI MOTOR COMPANY, Seoul (KR)

(72) Inventor: Jung Ik Kim, Yongin-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 15 days.

(21) Appl. No.: 15/162,955

(22) Filed: May 24, 2016

(65) Prior Publication Data
US 2017/0162889 A1  Jun. 8, 2017

(30) Foreign Application Priority Data
Dec. 8, 2015  (KR) .................. 10-2015-0174488

(51) Int. Cl.
| | | |
|---|---|---|
| H01M 8/04 | (2016.01) | |
| H01M 8/02 | (2016.01) | |
| H01M 8/24 | (2016.01) | |
| H01M 8/10 | (2016.01) | |
| H01M 8/04291 | (2016.01) | |
| H01M 8/04029 | (2016.01) | |
| H01M 8/04537 | (2016.01) | |
| H01M 8/04694 | (2016.01) | |
| H01M 8/04828 | (2016.01) | |
| H01M 8/2483 | (2016.01) | |

(52) U.S. Cl.
CPC ... *H01M 8/04291* (2013.01); *H01M 8/04029* (2013.01); *H01M 8/04559* (2013.01); *H01M 8/04694* (2013.01); *H01M 8/04828* (2013.01); *H01M 8/2483* (2016.02); *H01M 2250/20* (2013.01); *Y02T 90/32* (2013.01)

(58) Field of Classification Search
None
See application file for complete search history.

(56) References Cited

U.S. PATENT DOCUMENTS

| | | | |
|---|---|---|---|
| 7,972,746 B2 | 7/2011 | Kallo | |
| 2008/0152987 A1* | 6/2008 | Nakashima | H01M 8/04089 429/414 |

FOREIGN PATENT DOCUMENTS

| | | | |
|---|---|---|---|
| JP | 2005-005247 A | 1/2005 | |
| JP | 2009/021080 | * 1/2009 | ............. H01M 8/02 |
| JP | 2009-021080 A | 1/2009 | |
| JP | 2009-193900 A | 8/2009 | |
| KR | 10-2002-0093107 A | 12/2002 | |

(Continued)

OTHER PUBLICATIONS

English translation of JP 2009/021080 (2009).*

(Continued)

*Primary Examiner* — Yoshitoshi Takeuchi
(74) *Attorney, Agent, or Firm* — McDermott Will & Emery LLP

(57) ABSTRACT

A fuel cell includes: a stack having a manifold in which a fluid flows and having a plurality of flowing spaces which communicate with the manifold through openings; a shielding part having a plurality of shielding strips arranged in a stacked direction of the stack and selectively moving along the manifold to shield at least some of the plurality of flowing spaces; and a driver coupled with the shielding part to move the shielding part.

8 Claims, 7 Drawing Sheets

(56) References Cited

FOREIGN PATENT DOCUMENTS

| KR | 10-2015-0050097 A | 5/2015 |
|---|---|---|
| KR | 10-2015-0075260 A | 7/2015 |

OTHER PUBLICATIONS

Zhang et al, Introduction to Mechanisms, CMU website (2014).*
Korean Office Action issued in Application No. 10-2015-0174488 dated Nov. 11, 2016.

* cited by examiner

FUEL CELL AND CONTROL METHOD FOR THE SAME

CROSS REFERENCE TO RELATED APPLICATION

The present application claims the benefit of priority to Korean Patent Application No. 10-2015-174488, filed on Dec. 8, 2015, the entire content of which is incorporated herein for all purposes by this reference.

TECHNICAL FIELD

The present disclosure relates to a fuel cell and a control method for the same, and more particularly, to a fuel cell and a control method for the same capable of solving a flooding phenomenon by selectively shielding reaction spaces and cooling spaces, which communicate with each manifold of a fuel cell stack.

BACKGROUND

A fuel cell generates electrical energy using movement of electronics that are generated during oxidation and reduction reactions of reactants. In these reactions, ions generated from the reactants move between each of the electrodes through an electrolyte membrane and electrons generated by a chemical reaction of the reactants move through the electrode provided at each reactant side. In order to increase a reaction rate of gas that becomes the reactants, a gas diffusion layer (GDL) is provided on outer surfaces of the each electrode.

The electrolyte membrane and each electrode are surface-attached to each other to easily move the ions, which is a membrane electrode assembly (MEA). The membrane electrode assembly has a thin thickness and low rigidity. Therefore, the membrane electrode assembly may be easily deformed or damaged during the bonding process and thus has a high defective rate, and may be easily deformed and damaged even upon handling.

Therefore, a reaction layer in which the membrane electrode assembly and the gas diffusion layer are integrated is manufactured by injection-molding an integrated frame by stacking the membrane electrode assembly and the gas diffusion layer and using a resin, etc., on an outer circumferential surface thereof, such that the handling easiness of the membrane electrode assembly may be improved.

Bipolar plates are stacked on an upper surface and a lower surface of the reaction layer to form the fuel cells and the cells are stacked to form a fuel cell stack. In the fuel cell stack, a reaction space is formed between the reaction layer and the bipolar plate to make reaction gases flow and a cooling space is formed between the bipolar plates to allow cooling water flow.

In the fuel cell using hydrogen and oxygen as the reaction gases, if each of the reaction gases reacts to each other, water is generated as the resultants. In the reaction layer, the electrolyte membrane requires a predetermined level of moisture to move the reaction ion. However, if the amount of water generated by the reaction of hydrogen with oxygen increases, the electrolyte membrane covers a surface of the reaction layer to prevent the reaction gases from being contacted with the reaction layer, and thereby, the reaction does not occur.

As described above, a phenomenon, in which water is the reactants within each of the fuel cells and is excessive and thus the chemical reaction due to the reaction gases is suddenly reduced, is called a flooding phenomenon. To prevent the above phenomenon, it is necessary to remove the water generated in each of the fuel cells when operating the fuel cell.

The contents described as the related art have been provided only for assisting in the understanding for the background of the present disclosure and should not be considered as corresponding to the related art known to those skilled in the art.

SUMMARY

An object of the present disclosure is to provide a fuel cell and a control method for the same capable of effectively solving a flooding phenomenon occurring in an end cell of a fuel cell stack by selectively shielding some of reaction spaces and cooling spaces.

According to an exemplary embodiment in the present disclosure, a fuel call includes a stack having a manifold in which a fluid flows and having a plurality of flowing spaces which communicate with the manifold through openings; a shielding part having a plurality of shielding strips arranged in a stacked direction of the stack and selectively moving along the manifold to shield at least some of the plurality of flowing spaces; and a driver coupled with the shielding part to move the shielding part.

The fuel cell may further include a controller configured to drive the driver when a flooding phenomenon occurs in the reaction space to move the shielding part to thereby position the shielding strip at the opening of the flowing space to shield the flowing space, in which the flowing space may include the reaction space in which reaction gas flows and a cooling space in which cooling water flows.

The manifold may include a gas manifold communicating with the reaction space and a cooling water manifold communicating with the cooling space in the flowing space, the shielding part may be provided on the gas manifold, and the shielding strip may be positioned at a central portion of the gas manifold based on the stacked direction of the stack to selectively shield the opening of the reaction space formed at a central portion of the stack.

The manifold may include a gas manifold communicating with the reaction space and a cooling water manifold communicating with the cooling space in the flowing space, the shielding part may be provided on the cooling water manifold, and the shielding strips of the shielding parts may be positioned at both end portions of the cooling water manifold based on the stacked direction of the stack to selectively shield the openings of the cooling spaces formed at both end portions of the stack.

The controller may detect an output voltage of each of the reaction layers provided in the stack to recognize the flooding phenomenon of the reaction space.

The shielding part may be provided on the manifold and may have a shielding strip fixing member extending in a parallel direction with the manifold, the shielding strip may have an end portion coupled with the shielding strip fixing member, and the shielding strip fixing member may have an end portion coupled with the driver to move along the manifold.

An end, portion of the shielding part may have a rack gear to be coupled with the driver of which the output shaft has a pinion gear.

One end portion of the shielding part may have a first shaft rotated by the driver and wound with the shielding part and another end portion of the shielding part may have a second shaft recovered and rotated by an elastic member and wound with the shielding part.

The shielding strip may be provided so that a width thereof formed in a length direction of the manifold is the same as that of the opening formed at the flowing space side.

The shielding strips may be provided so that a spaced distance therebetween is the same as that between the openings to simultaneously open or shield the plurality of openings by the movement of the shielding part.

According to another exemplary embodiment in the present disclosure, a control method for a fuel cell includes: a first determining step of determining, by a controller, whether a flooding phenomenon occurs in a reaction space of a stack; a flooding solving step of shielding a flowing space formed in the stack using a plurality of shielding strips provided at the shielding part by adjusting a position of the shielding part provided on a manifold of the stack by allowing the controller to drive a driver when the flooding phenomenon occurs in the reaction space; a second determining step of determining, by the controller, whether the flooding phenomenon of the reaction space is solved by the flooding solving step; and a returning step of adjusting the position of the shielding part by allowing the controller to drive the driver to open the shielded flowing space again, if the controller determines that the flooding phenomenon of the reaction space is solved in the second determining step.

In the first determining step and the second determining step, the controller may detect an output voltage of each of the reaction layers provided in the stack to recognize whether the flooding phenomenon of the reaction space occurs or is solved.

DETAILED DESCRIPTION

Hereinafter, exemplary embodiments in the present disclosure will be described with reference to the accompanying drawings.

Figure 1:
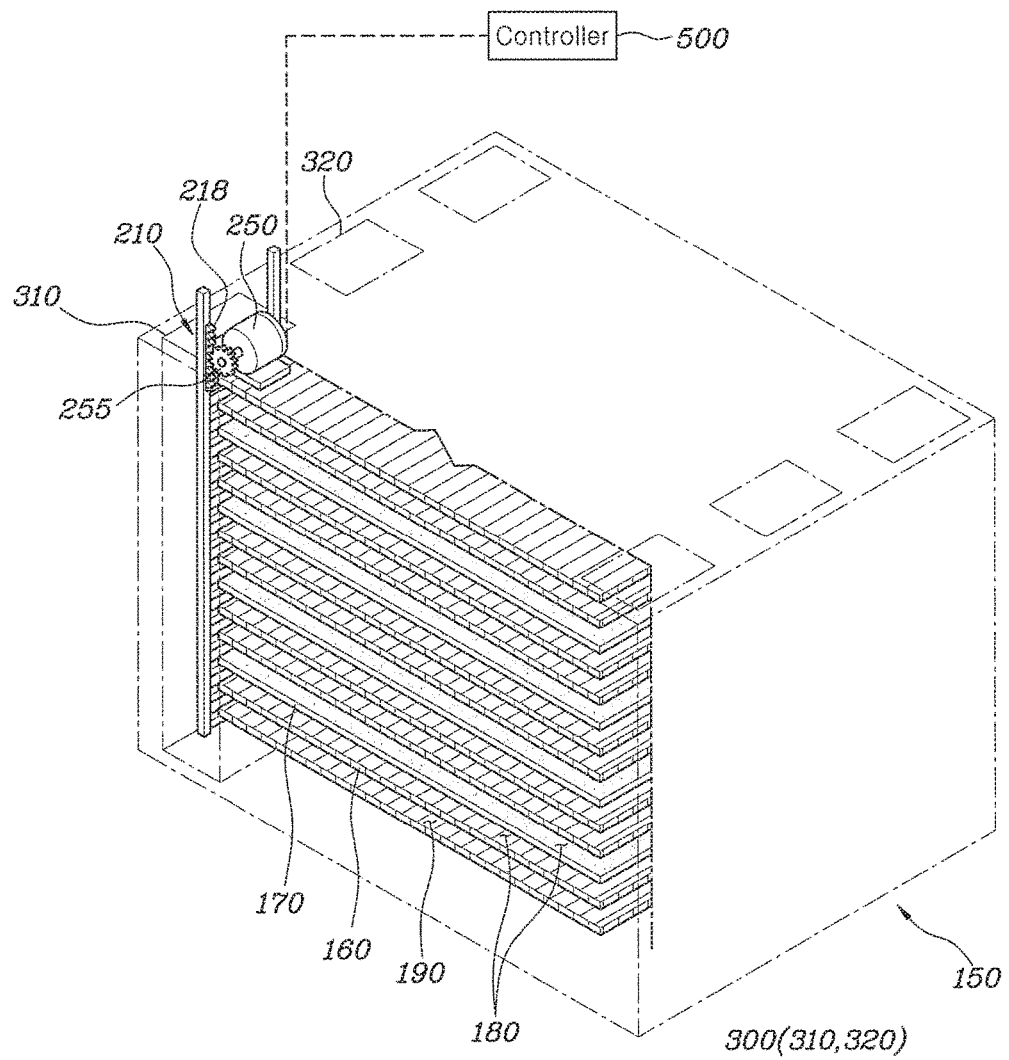
FIG. 1 is a view illustrating a fuel cell according to an exemplary embodiment in the present disclosure.
Figure 2:
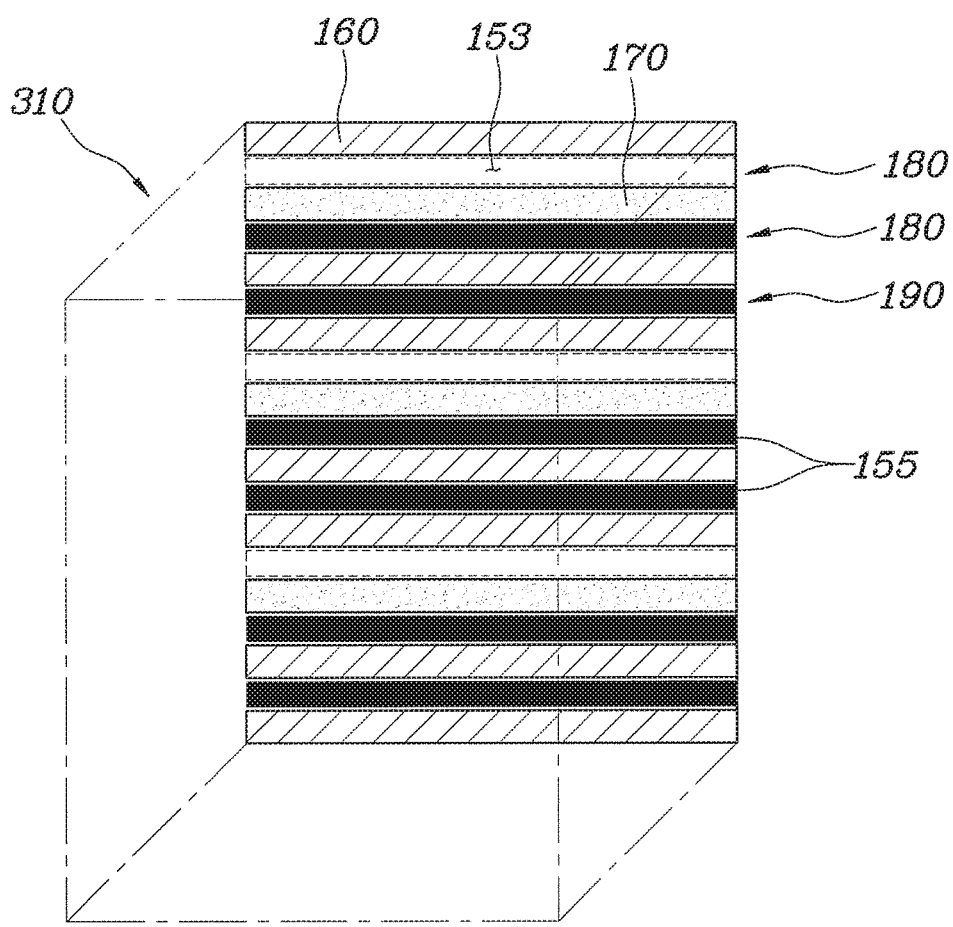
FIG. 2 is a view illustrating a gas manifold in the fuel cell according to the exemplary embodiment in the present disclosure.
Figure 3:
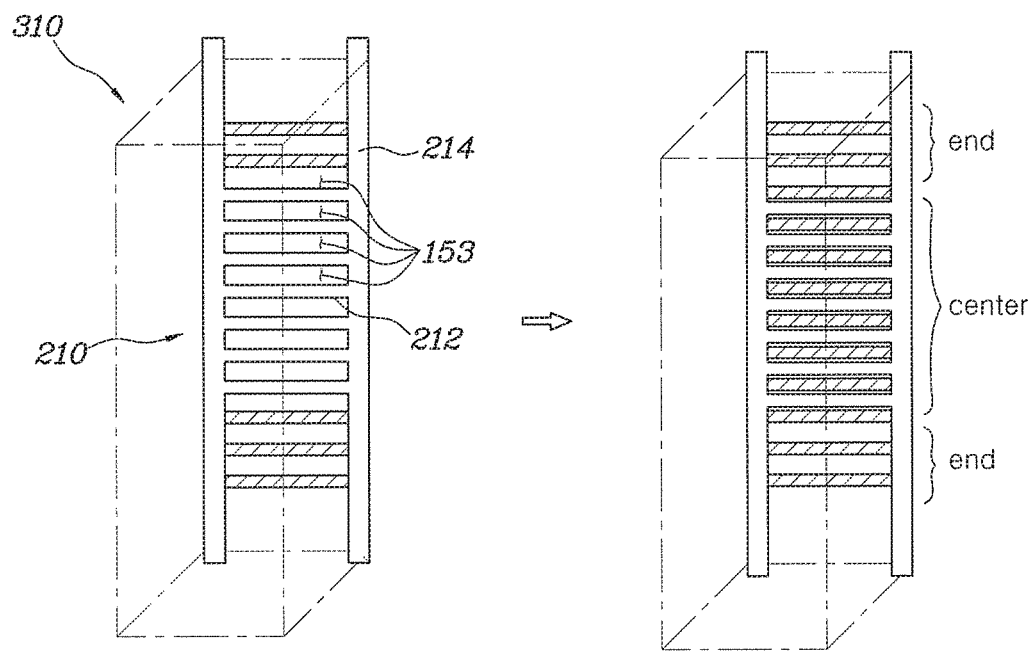
FIG. 3 is a diagram illustrating an operation process of a shielding part provided at the gas manifold side in the fuel cell according to the exemplary embodiment in the present disclosure.

As illustrated in FIGS. 1 to 3, a fuel cell according to an exemplary embodiment in the present disclosure includes: a stack 150 having a manifold 300 in which a fluid flows and having a plurality of flowing spaces which communicate with the manifold 300 through openings 153; a shielding part 210 having a plurality of shielding strips 212 arranged in a stacked direction of the stack 150 and selectively moving along the manifold 300 to shield at least some of the plurality of flowing spaces; and a driver 250 coupled with the shielding part 210 to move the shielding part 210.

The stack 150 has the manifold 300 in which a fluid flows and has the plurality of flowing spaces communicating with the manifold 300 through the openings 153. FIG. 1 illustrates the stack 150 having the manifold 300 in which hydrogen, oxygen, and cooling water each flow.

The fuel cell includes an electrolyte membrane through which reactants move while being ionized and a membrane electrode assembly coupled with electrodes through which electrons move and both surfaces of the membrane electrode assembly have gas diffusion layers to improve reactivity.

As described above, one layer in which the membrane electrode assembly and the gas diffusion layer are included is called a reaction layer 170 in the present disclosure, and both surfaces of the reaction layer 170 have a bipolar plate 160 to form one fuel cell.

The fuel cell is stacked in plural to form the fuel cell stack 150. Here, the stacked number of the cell is set in consideration of an output voltage required in an apparatus in which the fuel cell is generally included and the stack 150 is configured.

As the reaction gas used in the fuel cell, in particular, hydrogen and oxygen have been mainly used. If hydrogen reacts to oxygen, water is generated as a reaction product. Thus, the fuel cell is environmentally-friendly. Further, to remove heat generated from a chemical reaction of hydrogen with oxygen, cooling water is used.

The reaction space 180 is formed between the reaction layer 170 and the bipolar plate 160, and thus, hydrogen or oxygen flows in the reaction space 180. Further, the cooling space 190 in which the cooling water for removing heat generated by the chemical reaction of hydrogen with oxygen flows is formed between the bipolar plates 160 as between any one cell and the other cell.

According to the present disclosure, a general term of the reaction space 180 and the cooling space 190 is defined as a flowing space. In particular, a positional relationship of each layer as a structure of the stack 150 formed with the flowing space is illustrated in FIGS. 1 and 2.

If the respective fluids provided to the stack 150 are mixed with each other, reactivity of the reaction gases may be reduced and the efficiency of the fuel cell may be suddenly reduced. Therefore, it is important to seal the respective fluids so that respective fluids are not mixed with each other.

As described above, a sealer 155 for preventing the respective fluids from being mixed with each other may be provided as illustrated in FIG. 2. FIG. 2 illustrates a gas manifold 310. Here, the flowing space other than the reaction space 180 to which the reaction gases flowing in the gas manifold 310 need to be supplied includes the sealer 155 to prevent the corresponding reaction gases from flowing.

For example, when hydrogen flows through the gas manifold 310, the openings 153 of the reaction space 180 and the cooling space 190 in which oxygen flows shield the flow of hydrogen through the sealer 155.

The shielding part 210 has a plurality of shielding strips 212 arranged along a stacked direction of the stack 150 and selectively moves along the manifold 300 to shield at least some of the plurality of flowing spaces. FIG. 3 illustrates a shape of the shielding part 210.

The manifold 300 formed in the stack 150 may be provided in a shape of a channel penetrating through the stack 150 in parallel with a stacked direction of cells in the stack 150. The shielding part 210 may be provided in the manifold 300 in a shape extending in a direction parallel with a length direction of the manifold 300.

Further, the shielding part 210 has the plurality of shielding strips 212, in which the shielding strips 212 are arranged along the stacked direction of the stack 150 to correspond to the positions of the openings 153 of each of the flowing spaces. The shielding strip 212 may be provided in the strip (long bar) shape to correspond to the shape of the openings 153 of each of the flowing spaces formed in a slit shape and may be integrally formed in the shielding part 210. The shielding strip 212 may also be individually molded to be coupled with the shielding part 210.

The shielding part 210 may move in the manifold 300 and the shielding strips 212 may be selectively positioned at the openings 153 of the flowing space that communicates with the corresponding manifold 300 according to the movement of the shielding part 210, FIG. 3 illustrates an operation process of shielding the openings 153 of a portion (central cell side) of the flowing space by selectively moving the shielding part 210 provided on the gas manifold 310.

When the flow of fluids in the flowing space needs to be protected for various reasons, the flow of fluids may be simply and effectively shielded according to the operation of the shielding part 210, thereby improving the control performance of the fuel cell.

The fuel cell may be designed to generate electrical energy by the reaction of hydrogen with oxygen while the hydrogen flows in one side of the reaction layer 170 and the oxygen (air) flows in another side of the reaction, layer 170. In this case, water is generated in the reaction space 180 in which the oxygen flows according to the chemical reaction of hydrogen with oxygen.

It is necessary to remove the water formed, during the above process in effectively managing the fuel cell. If the water at the reaction space 180 side in which the oxygen flows is not removed, the water is excessive to shield the reaction gases from being contacted to the reaction layer 170, such that the coding phenomenon that the output voltage of the fuel cell is suddenly reduced may occur.

Therefore, according to the present disclosure, the flow of fluids of a portion of the flowing space is limited to improve control performance of the fuel cell. In particular, the water in the flowing space in which the flooding phenomenon occurs is removed by shielding the flow of fluids in the flowing space in which the flooding phenomenon does not occur, thereby solving the flooding phenomenon.

Upon the operation of the shielding part 210 to remove the flooding phenomenon, the action effects to solve the flooding phenomenon according to a kind of fluids of which the flow is shielded by the shielding part 210 may be different and the detailed contents thereof will be described below.

The driver 250 is coupled with the shielding part 210 to move the shielding part 210. FIG. 1 illustrates the driver 250 provided at an upper end portion of the stack 150.

The driver 250 may be provided at an outer side of the stack 150 in consideration of a design aspect and coupled with an upper end portion of the shielding part 210. The driver 250 provides a driving force to the upper end portion of the shielding part 210 to adjust the position of the shielding part 210 on the manifold 300.

The operation of the driver 250 as described above is controlled by a controller 500 and the shielding part 210 is selectively moved by the driver 250, and thus, the shielding strip 212 opens the openings 153 of a portion of the flowing space.

Accordingly, the supply of fluids of a portion of the flowing space is protected by the operation of the shielding part 210 to control the required flowing according to the driving condition of the fuel cell, thereby effectively improving the control performance and efficiency of the fuel cell. According to the present disclosure, each of the fluid flows is controlled upon the occurrence of the flooding phenomenon of the fuel cell to effectively solve the flooding phenomenon.

Referring back to FIG. 1, the fuel cell according to the present disclosure further includes a controller 500 configured to drive the driver 250 when the flooding phenomenon occurs in the reaction space 180 to move the shielding part 210 to thereby position the shielding strip 212 at the openings 153 of the flowing space to shield the flowing space, in which the flowing space 180 includes the reaction space 180 in which reaction gas flows and the cooling space 190 in which cooling water flows.

In detail, as described above, the flowing space includes the reaction space 180 and the cooling space 190 and the controller 500 connects between each of the reaction layers 170 of the stack 150 and the driver 250 to determine the flooding phenomenon of the reaction layer 170. If it is determined that the flooding phenomenon occurs, the controller 500 drives the driver 250 to move the shielding part 210.

The driver 250 driven by the controller 500 moves the shielding part 210 and the shielding part 210 moved by the driver 250 shields the supply of fluid to the corresponding flowing space by positioning the shielding strip 212 at the openings 153 of a portion of the flowing space.

As described above, the flooding phenomenon is differently prevented according to the kind of manifold 300 at which the shielding part 210 is positioned. That is, when the shielding part 210 is provided on the gas manifold 310 having hydrogen or oxygen flowing therein and communicates with the plurality of reaction spaces 180 formed in the stack 150, if a portion of the reaction space 180 is protected, the flow rate and flow velocity of the reaction gases flowing in the remaining reaction spaces 180 are increased to increase the effect of removing water, thereby solving the flooding phenomenon.

When the shielding part 210 is provided on a cooling water manifold 320 having cooling water flowing therein and communicates with the plurality of cooling space 190 formed in the stack 150, if a portion of the cooling spaces 190 is protected, heat generated by the reaction between the reaction gases is not removed in the cell in which the flow of cooling water is protected to increase the heat of the reaction space 180. At that time, water is vaporized by the increased heat to be discharged from the reaction space 180 along with the flow of reaction gases.

Consequently, when the flooding phenomenon occurs in the stack 150, the controller 500 drives the driver 250 to move the shielding part 210, thereby shielding the flow of fluids of a portion of the flowing space, and as a result, the reflective effect obtained by shielding the flow of fluids removes the water generated in the reaction space 180.

Figure 5:
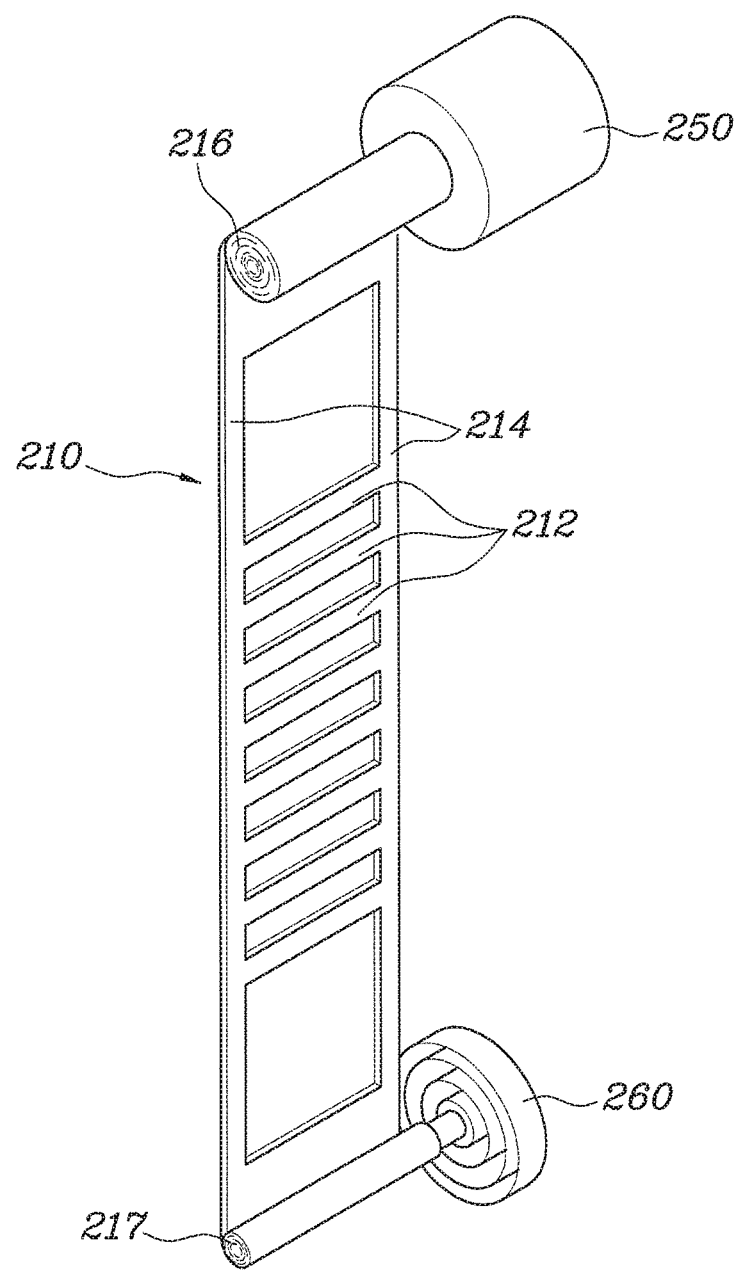
FIG. 5 is a view illustrating a shielding part provided at a gas manifold side in a fuel cell according to another exemplary embodiment in the present disclosure.

As illustrated in FIGS. 3 and 5, in the fuel cell according to the present disclosure, the gas manifold 310 communicates with the reaction space 180 and the cooling water manifold 320 communicates with the cooling space 190 in the flowing space. The shielding part 210 is provided on the gas manifold 310, and the shielding strip 212 is positioned at a central portion of the gas manifold 310 based on the stacked direction of the stack 150 to selectively shield the openings 153 of the reaction space 180 formed at the central portion of the stack 150.

In detail, the manifold 300 may be divided into the cooling water manifold 320 communicating with the cooling space 190 and the gas manifold 310 communicating with the reaction space 180. The shielding part 210 provided on the gas manifold 310 shields the reaction space 180 of the central cell positioned at the central side of the stack 150.

The fuel cell includes the plurality of flowing spaces and each of the flowing spaces is supplied with a fluid flowing through the communicating manifold 300. In this case, when water is generated in the reaction space 180 in which air (oxygen) flows, the water moves by the effect of fluids flowing in the corresponding reaction space 180 to be discharged through an outlet of fluids.

According to such a fluid supplying scheme, end cells positioned at an end portion of the manifold 300 may have flow rate and flow velocity of fluids lower than those of a central cell, and therefore, the occurrence of the flooding phenomenon may increase.

Further, the end cells positioned at the end portion of the stack 150 discharge heat to outside and thus may have temperature relatively lower than that of the central cell. As a result, the vaporized level of water is reduced, and thus, the end cells are vulnerable to the flooding phenomenon.

Here, in the shielding part 210 provided in the gas manifold 310, the shielding strip 212 is provided at the central cell side of the stack 150 and moves according to the driving of the driver 250 upon the occurrence of the flooding phenomenon to shield the openings 153 of the reaction space 180, thereby increasing the flow rate and flow velocity of the reaction gases supplied to the end cell side. The operation process of the shielding part 210 shielding the openings 153 of the reaction space 180 of the central cell is illustrated in FIG. 3 and the shape of the shielding part 210 is illustrated in FIG. 5.

Therefore, the reaction gases having the increased flow rate and flow velocity may effectively increase the removed amount of water generated in the end cell to effectively solve the flooding phenomenon of the end cell relatively vulnerable to the flooding phenomenon.

Figure 4:
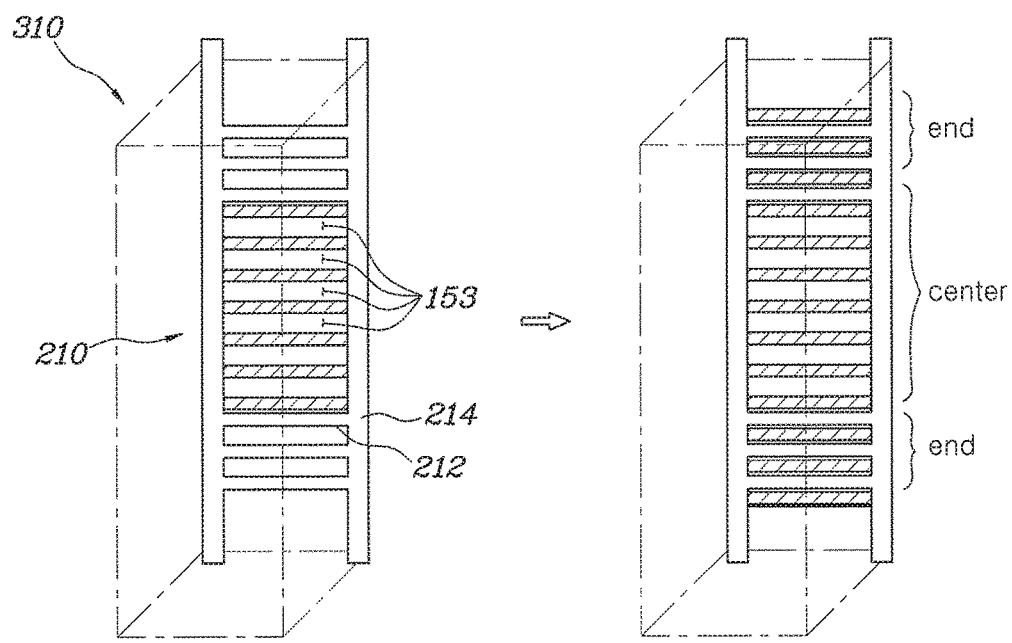
FIG. 4 is a diagram illustrating an operation process of a shielding part provided at a cooling water manifold side in the fuel cell according to the exemplary embodiment in the present disclosure.
Figure 6:
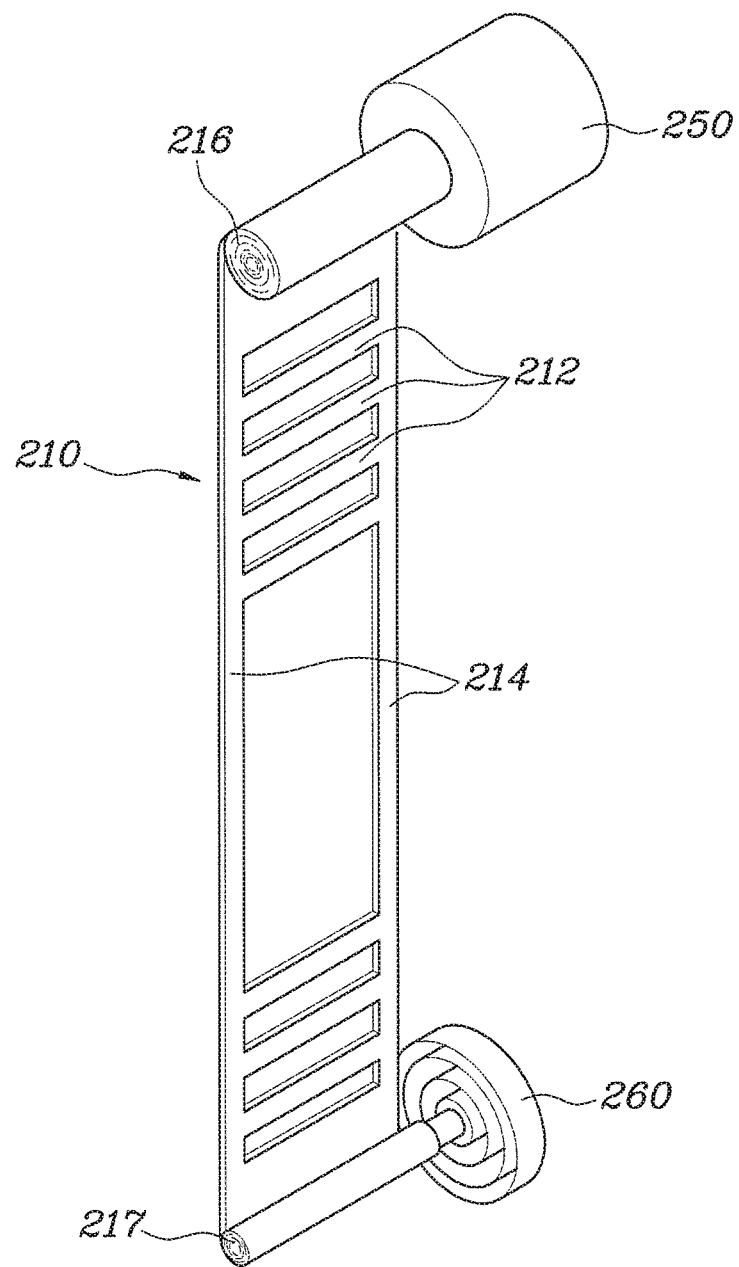
FIG. 6 is a view illustrating a shielding part provided at a cooling water manifold side in the fuel cell according to another exemplary embodiment in the present disclosure.

Referring to FIGS. 4 and 6, in the fuel cell according to the present disclosure, the gas manifold 310 communicates with the reaction pace 180, and the cooling water manifold 320 communicates with the cooling space 190 in the flowing space. The shielding part 210 is provided on the cooling water manifold 320, and the shielding strip 212 of the shielding part 210 is positioned at a central portion of the cooling water manifold 320 based on the stacked direction of the stack 150 to selectively shield the openings 153 of the cooling spaces 190 formed at both end portions of the stack 150.

In detail, the manifold 300 of the fuel cell may be divided into the cooling water manifold 320 communicating with the cooling space 190 and the gas manifold 310 communicating with the reaction space 180. The shielding part 210 provided on the cooling water manifold 320 protects the cooling space 190 of the end cell positioned at the end portion side of the stack 150.

Further, as described above, the end cells positioned at the end portion of the stack 160 discharge neat to the outside and thus may have temperature relatively lower than that of the central cell. As a result, vaporized level of water is reduced and thus the end cells are vulnerable to the flooding phenomenon.

In the end, in the shielding part 210 provided in the cooling water manifold 320, the shielding strip 212 provided at the end cell side of the stack 150 and moves according to the driving of the driver 250 upon the occurrence of the flooding phenomenon to shield the openings 153 of the reaction space 180 at the central cell side, thereby increasing the flow rate and flow velocity of the reaction gases supplied to the end cell side. The operation process of the shielding part 210 shielding the openings 153 of the reaction space 180 of the central cell is illustrated in FIG. 3 and the shape of the shielding part 210 is illustrated in FIGS. 3 to 5.

Therefore, the reaction gases having the increased flow rate and flow velocity may effectively increase the removed amount of water generated in the end cell to effectively solve the flooding phenomenon of the end cell relatively vulnerable to the flooding phenomenon.

In the fuel cell according to the present disclosure, the controller 500 detects an output voltage of each of the reaction layers 170 provided in the stack 150 to recognize the flooding phenomenon of the reaction space 180.

In detail, the controller 500 is connected to the stack 150 to detect the output voltage generated from each of the reaction layers 170. In this case, the damage of the reaction layer 170, the lack of the reaction gases, the flooding phenomenon, etc., may be determined by analyzing a graph of a change in output voltage of the reaction layer 170.

Therefore, the controller 500 recognizes the flooding phenomenon of the fuel cell by the graph of the change in output voltage of the reaction layer 170. The detailed determination on whether the flooding phenomenon occurs may be made by detecting the change aspect in the output voltage experimentally or theoretically determined.

The determination on whether the flooding phenomenon is solved may also be made that a normal state returning level of the output voltage reaches a predetermined level and the returning level of the output voltage for considering that the flooding phenomenon is solved may be determined variously.

Referring to FIGS. 3 to 6, in the fuel cell according to the present disclosure, the shielding part 210 is provided on the manifold 300 and has a shielding strip fixing member 214 extended in a parallel direction with the manifold 300. The shielding strip 212 has an end portion coupled with the shielding strip fixing member 214, and the shielding strip fixing member 214 has an end portion coupled with the driver 250 to move along the manifold 300.

In detail, to shield the openings 153 of the flowing space formed on the manifold 300, the shielding part 210 has the shielding strip 212 having the shape of the openings 153. Both end portions of the shielding strip 212 may be coupled with the shielding strip fixing member 214 provided in pair.

The shielding strip fixing member 214 has a bar shape extending in a direction parallel with a length direction of the manifold 300 and is each provided at both end portions of shielding strip 212. The shielding strip fixing member 214 and the shielding strip 212 may be made of the same material and may also be molded integrally. The shielding strips 212 may be individually molded to be coupled with the shielding strip fixing members 214.

The shielding part 210 with which the shielding strip fixing member 214 and the shielding strip 212 are coupled has a shape similar to trapezoid. The end portion of the shielding strip fixing member 214 is coupled with the driver 250, and thus, the shielding strip fixing member 214 vertically moves along the length direction of the manifold by the driver 250 and the shielding part 210 moves. The shape of the shielding part 210 is illustrated in FIGS. 3 to 6.

A portion protruding by extending the shielding strip fixing member 214 toward the end portion of the manifold 300 is coupled with the driver 250 to move the shielding part 210 even though the driver 250 is not coupled with the shielding part 210 within the manifold 300. Thus, the shielding part 210 may have an advantage in space application and the plurality of shielding strips 212 may be simultaneously coupled with each other to simply move all the shielding strips 212.

Referring back to FIG. 1, the end portion of the shielding part 210 has a rack gear 218 coupled with the driver 250 of which an output shaft is provided with a pinion gear 255.

One side surface facing the output shaft of the driver 250 at the end portion of the shielding strip fixing member 214 that is the end portion of the shielding part 210 has the rack gear 218. The rack gear 218 is meshed with the pinion gear 255 provided at the output shaft of the driver 250 to allow the driver 250 to vertically move the shielding part 210.

Therefore, the vertical displacement of the shielding part 210 may be controlled by controlling a rotating angle of the driver 250 provided as a step motor. The shape of the end portion coupled with the driver 250 as the shape of the shielding part 210 is illustrated in FIG. 1.

Referring to FIGS. 5 and 6, in a fuel cell according to another exemplary embodiment in the present disclosure, one end portion of the shielding part 210 has a first shaft 216 rotating by the driver 250 and wound with the shielding part 210. Another end portion of the shielding part 210 has a second shaft 217 recovered and rotating by an elastic member 260 and wound with the shielding part 210.

In detail, the shielding part 210 is a thin film made of materials having strong flexibility and is wound around the first and second shafts by the elastic member 260 or the driver 250. One end portion of the shielding part 210 is wound around the first shaft 216 rotating by the driver 250. The driver 250 may be a step motor and rotates by a predetermined level in a predetermined direction according to an instruction of the controller 500.

The other end portion of the shielding part 210 has the second shaft 217 and the second shaft 217 has the elastic member 260 providing a rotating force to the second shaft 217. If the first shaft 216 rotates by the driver 250 and the shielding part 210 moves toward the first shaft 216, the elastic member 260 of the second shaft 217 rotates by a tension of the shielding part 210 to store elastic energy and a portion of the shielding part 210 wound around the second shaft 217 deviates from the second shaft 217, and thus, the shielding part 210 moves toward the first shaft 216.

When the shielding part 210 returns to an original position, the driver 250 rotates by a predetermined level in a reverse direction to the direction in which the shielding part 210 is wound according to the instruction of the controller 500, the elastic member 260 of the second shaft 217 provides the elastic energy stored by the tension of the shielding part 210 to the second shaft 217 to allow the shielding part 210 to be wound around the second shaft 217 by a predetermined level while the second shaft 217 is recovered and rotated such that the shielding part 210 provided in a film shape may be positioned on the manifold 300 while the tension of the shielding part 210 is always maintained during the operation process of the shielding part 210.

The shielding part 210 has a thin film shape and is always maintained in a tension state to adhere to the openings 153 of the flowing space to maintain the shielding effect, thereby reducing a burden to the design of the shielding part 210 and increasing the shielding effect. FIGS. 5 and 6 illustrate the appearance of the shielding part 210 according to the exemplary embodiments.

Referring back to FIGS. 3 and 4, in the fuel cell according to the present disclosure, the shielding strip 212 is provided so that a width thereof formed in the length direction of the manifold 300 is the same as that of the openings 153 formed at the flowing space side.

In detail, the shielding part 210 shields the openings 153 of the flowing space communicating with the manifold 300 and the width thereof is formed over that of the openings 153 or may be formed to be the same as that of the openings 153, thereby improving the shielding effect of the flowing space.

Further, the shielding strips 212 are provided so that a spaced distance therebetween is the same as that between the openings 153 to simultaneously open or shield the plurality of openings 153 by the movement of the shielding part 210.

In detail, the shielding strip 212 may be maintained to be fixed to the shielding strip fixing member 214, etc., and move together according to the movement of the shielding strip fixing member 214, etc., and at the same time, has the same spaced distance as the spaced distance between the openings 153 to shield the openings 153 of the plurality of flowing spaces.

Therefore, even though the displacements of each of the shielding strips 212 are not controlled, the openings 153 of the plurality of flowing spaces are opened or shielded at a time, thereby maximizing the effects of the present disclosure. FIGS. 3 and 4 illustrate that the shielding stripe 212 provided at the flowing space side, which needs to be shielded, has the same spaced distance as the spaced distance between the openings 153.

Figure 7:
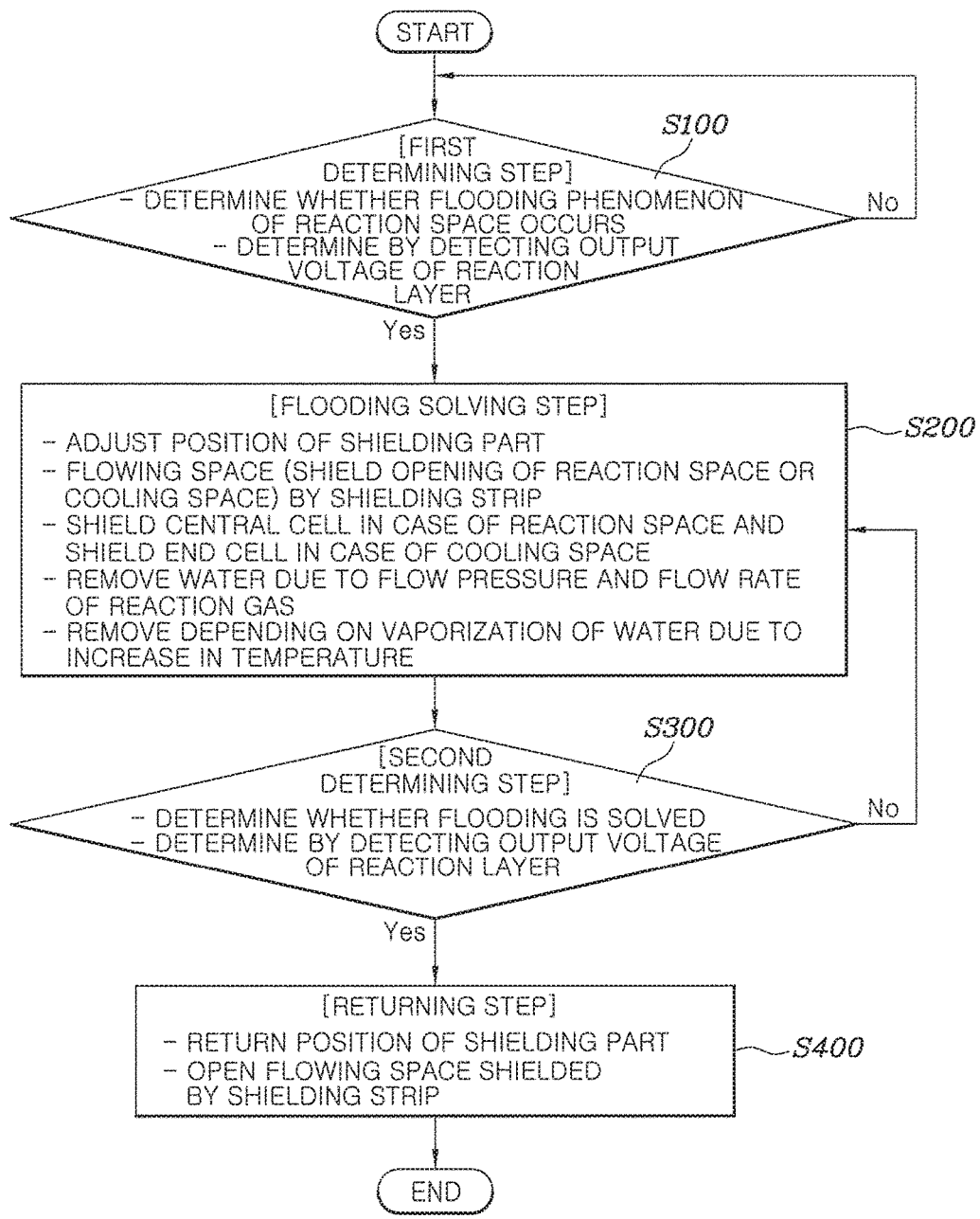
FIG. 7 is a flow chart illustrating a control method for a fuel cell according to an exemplary embodiment in the present disclosure.

Referring to FIG. 7, a control method for a fuel cell according to an exemplary embodiment in the present disclosure includes: a first determining step (S100) of determining, by the controller 500, whether the flooding phenomenon occurs in the reaction space 180 of the stack 150; a flooding solving step (S200) of shielding the flowing space formed in the stack. 150 using the plurality of shielding strips 210 provided at the shielding part 210 by adjusting the position of the shielding part 210 provided on the manifold 300 of the stack 150 by allowing the controller 500 to drive the driver 250 when the flooding phenomenon occurs in the reaction space 180; a second determining step (S300) of determining, by the controller 500, whether the flooding phenomenon of the reaction space 180 is solved by the flooding solving step (S200); and a returning step (S400) of adjusting the position of the shielding part 210 by allowing the controller 500 to drive the driver 250 to open the shielded flowing space again, if the controller 500 determines that the flooding phenomenon of the reaction space 180 is solved in the second determining step (S300).

In the first determining step (S100), the controller 500 determines whether the flooding phenomenon occurs in the reaction space 180 of the stack 150. As described above, the controller 500 performs the determination by detecting the change in the output voltage of each of the reaction layers 170.

In the flooding solving step (S200), when the flooding phenomenon occurs in the reaction space 180, the controller 500 drives the driver 250 to adjust the position of the shielding part 210 provided on the manifold 300 of the stack 150, thereby shielding the flowing space formed in the stack 150 using the plurality of shielding strips 212 provided at the shielding part 210.

The controller 500 adjusts the position of shielding part 210 to position the shielding strip 212 on the openings 153 of the flowing space, thereby shielding the flow of fluids in some of the flowing spaces. When the shielding part 210 is positioned on the gas manifold 310, as a portion of the reaction space 180 is shielded, the flow rate and flow velocity of gases supplied to the remaining reaction spaces 180 increase, thereby improving the function of removing water.

When the shielding part is positioned on the cooling water manifold 320, as a portion of the cooling spaces 190 is shielded, the temperature in the fuel cell at the corresponding cooling space 190 side is increased to increase the vaporized amount of water generated in the reaction space 180, thereby improving the removal rate of water.

In the second determining step (S300), the controller 500 determines whether the flooding phenomenon of the reaction space 180 is solved by the flooding solving step (S200). The controller 500 may detect the graph of the change in the output voltage to perform the determination and the output voltage returning level for determining that the flooding phenomenon is solved may be variously determined experimentally or theoretically to be set in the controller 500 in advance.

In the returning step (S400), when the controller 500 determines that the flooding phenomenon of the reaction space 180 is solved in the second determining step (S300), the controller 500 drives the driver 250 to adjust the position of the shielding part 210 so that the shielded flowing space is opened again.

That is, when water is removed from the reaction space 180 since it is determined that the flooding phenomenon occurs and thus it is determined that the flooding phenomenon is solved, the shielding part 210 moved by the driver 250 to shield a portion of the flowing space moves again to open the openings 153 of the flowing space to return the flow rate and flow velocity of gases and the supplied amount of cooling water to the normal state.

As a result, the controller 500 determines whether the flooding phenomenon of the stack 150 occurs and moves the shielding part 210 to adjust the flowing of fluids, thereby removing the water of the reaction space 180 without the separate apparatus to solve the flooding phenomenon.

According to the fuel cell and the control method for the same as described above, it is possible to effectively solve the flooding phenomenon occurring in the end cell of the stack by selectively shielding some of the reaction spaces and the cooling spaces.

In particular, the shielding part is provided on the gas manifold in which, the reaction gas flows to selectively shield the supply of gas to some of reaction spaces to increase the flow rate and the flow velocity of gases flowing in the reaction spaces that are not shielded, thereby effectively solving the flooding phenomenon.

Further, the shielding part is provided, on the cooling water manifold in which the cooling water flows to selectively shield the supply of cooling water to the cooling space to increase the temperature in the fuel cell of the cooling space side in which the supply of cooling water is shielded in the short term so as to evaporate water, thereby solving the flooding phenomenon.

The shielding part provided on the gas manifold has the shielding strip positioned at the central cell side of the stack and the shielding part provided on the cooling water manifold has the shielding strip positioned at the end cell side of the stack to easily solve the flooding phenomenon of the end cell that relatively easily occurs.

Although the present disclosure has been shown and described with respect to specific exemplary embodiments, it will be obvious to those skilled in the art that the present invention may be variously modified and altered without departing from the spirit and scope of the present disclosure as defined by the following claims.

What is claimed is:

1. A fuel cell, comprising:
   a stack having manifolds, in which a fluid flows, and a plurality of flowing spaces which communicate with the manifolds through openings;
   shielding parts having a plurality of shielding strips arranged in a stacked direction of the stack, the shielding parts being configured to selectively move along the manifolds so that the plurality of shielding strips shield at least some of the plurality of flowing spaces; and
   a driver coupled with the shielding parts to move the shielding parts,
   wherein the flowing space includes:
      a reaction space in which reaction gas flows; and
      a cooling space in which cooling water flows,
   wherein the manifolds includes:
      a gas manifold communicating with the reaction space; and
      a cooling water manifold communicating with the cooling space,
   wherein one shielding part among the shielding parts is disposed on the gas manifold, and another shielding part among the shielding parts is disposed on the cooling water manifold,
   wherein each of the plurality of shielding strips of the one shielding part disposed on the gas manifold is located at a central portion of the gas manifold based on the stacked direction of the stack to selectively shield an opening of the reaction space at a central portion of the stack, and
   wherein the plurality of shielding strips of the other shielding part disposed on the cooling water manifold are located at both end portions of the cooling water manifold based on the stacked direction of the stack to selectively shield an opening of the cooling space at both end portions of the stack.

2. The fuel cell of claim 1, further comprising:
   a controller configured to drive the driver when a flooding phenomenon occurs in the reaction space to move the shielding parts to thereby position the plurality of shielding strips at the openings of the flowing spaces to shield the flowing spaces.

3. The fuel cell of claim 2, wherein the controller detects an output voltage of each of the reaction layers disposed in the stack to recognize the flooding phenomenon of the reaction space.

4. The fuel cell of claim 1, wherein each of the shielding parts is disposed on each of the manifolds and has a shielding strip fixing member extended in a parallel direction with the manifolds,
   wherein each of the plurality of shielding strips has an end portion coupled with the shielding strip fixing member, and
   wherein the shielding strip fixing member has an end portion coupled with the driver to move along the manifolds.

5. The fuel cell of claim 1, wherein an end portion of each of the shielding parts has a rack gear to be coupled with the driver of which an output shaft has a pinion gear.

6. The fuel cell of claim 1, wherein one end portion of the shielding part has a first shaft rotating by the driver and wound with the shielding part, and wherein another end portion of the shielding part has a second shaft recovered and rotating by an elastic member and wound with the shielding part.

7. The fuel cell of claim 1, wherein a width of each of the plurality of shielding strips formed in a length direction of the manifolds is the same as that of the opening formed at a flowing space side.

8. The fuel cell of claim 1, wherein a spaced distance between the shielding strips is the same as that between the openings to simultaneously open or shield the plurality of openings by the movement of each of the shielding parts.

* * * * *